US012609107B2

(12) United States Patent
Lian

(10) Patent No.: US 12,609,107 B2
(45) Date of Patent: Apr. 21, 2026

(54) METHOD AND SYSTEM FOR GENERATING SPEECH DATA FILE

(71) Applicant: UDN DIGITAL CO., LTD., New Taipei City (TW)

(72) Inventor: Chia-Ruei Lian, Yilan City (TW)

(73) Assignee: UDN DIGITAL CO., LTD., New Taipei City (TW)

( * ) Notice: Subject to any disclaimer, the term of this patent is extended or adjusted under 35 U.S.C. 154(b) by 167 days.

(21) Appl. No.: 18/757,147

(22) Filed: Jun. 27, 2024

(65) Prior Publication Data

US 2026/0004770 A1 Jan. 1, 2026

(51) Int. Cl.
*G10L 13/10* (2013.01)
*G10L 13/08* (2013.01)

(52) U.S. Cl.
CPC ........ *G10L 13/10* (2013.01); *G10L 2013/083* (2013.01); *G10L 2013/105* (2013.01)

(58) Field of Classification Search
CPC ............... G10L 13/10; G10L 2013/083; G10L 2013/105
See application file for complete search history.

(56) References Cited

U.S. PATENT DOCUMENTS 4,692,941 A 9/1987 Jacks et al.
5,850,629 A 12/1998 Holm et al.
11,010,645 B2 * 5/2021 Xu ........................ G06V 40/174
2007/0260461 A1 * 11/2007 Marple .................... G10L 13/10 704/260
2009/0006098 A1 * 1/2009 Nishiike ................. G10L 13/10 704/260
2024/0347064 A1 * 10/2024 Li .......................... G06N 3/045

FOREIGN PATENT DOCUMENTS

JP H04270394 A * 9/1992

OTHER PUBLICATIONS

JPH04270394A-MT (Year: 1992).*
Search Report appended to an Office Action, which was issued to Taiwanese counterpart application No. 112101307 by the TIPO on Aug. 21, 2023, with an English translation thereof.

* cited by examiner

*Primary Examiner* — Darioush Agahi
(74) *Attorney, Agent, or Firm* — Birch, Stewart, Kolasch & Birch, LLP

(57) ABSTRACT

A method for generating a speech data file from a text file, including: calculating a number of words included in a sentence part of the text file; calculating an expected duration for the sentence part based on the number of words; assigning a pausing time for the sentence part based on at least the expected duration and the saying time duration parameter, the pausing time to be attached at the end of the sentence part; and generating the speech data file associated with the text file, the speech data file including, for the sentence part, an audio speech part that, when played, includes voice of the sentence part, and a pausing part that follows the voice of the sentence part is played, that does not include the content of the sentence part, and that has a duration that equals to the associated pausing time.

6 Claims, 5 Drawing Sheets

{學生時期老師們都會為我們精心策辦活動}_{萬聖節是一年之中最期待的節日之一}_{爸爸媽媽也都絞盡腦汁配合學校活動}_{為自己小孩打扮}_{有的時候是自己提出想要扮什麼}_{但更多的時候是不情願}_{迎合父母口味打扮成他們想要的樣子}_{即便如此}_{到了學校與同學一起慶祝}_{一起上街要糖}_{也是非常快樂的}_

FIG. 4

{[學生時期老師們都會]#[為我們精心策辦活動]}_{[萬聖節是一年之中]#[最期待的節日之一]}_{[爸爸媽媽]#[也都絞盡腦汁配合學校活動]}_{[為自己小孩打扮}_{[有的時候]#[是自己提出想要扮什麼]}_{[但更多的時候]#[是不情願]}_{[迎合父母口味]#[打扮成他們想要的樣子]}_{即便如此}_{[到了學校]#[與同學一起慶祝]}_{一起上街要糖}_{也是非常快樂的}_

FIG. 5

METHOD AND SYSTEM FOR GENERATING SPEECH DATA FILE

FIELD

The disclosure relates to a method and a system for generating data, and more particularly to a method and a system for generating a speech data file to be outputted by an electronic device.

BACKGROUND

In the field of machine learning, the application of text-to-speech (TTS), which involves inputting a text into a computer system so that the computer system may create a speech audio output (i.e., "read out" the text), has become a very common feature. As the relevant technology advances, making the speech audio output sound more "natural" (i.e., more human like) and improving the quality of the speech audio output have become a pending task for researchers.

SUMMARY

Therefore, an object of the disclosure is to provide a method that can generate a speech data file from a text file. The speech data file, when played by an electronic device, may provide a synthesized voice of the content of the text file that is more natural.

According to one embodiment of the disclosure, the method for generating a speech data file from a text file is implemented using a system that stores a speaking rate parameter that reflects a time duration for a person to say a word, and a speaking time duration parameter that reflects a time duration for the person to say words in a continuous manner without trouble. The text file includes a plurality of sentence parts arranged in a sequential order. The method includes:

a) for each of the sentence parts, calculating a number of words included in the sentence part;

b) calculating an expected duration for the sentence part based on the number of words and the speaking rate parameter;

c) assigning a pausing time for the sentence part based on at least the expected duration and the speaking time duration parameter, the pausing time to be attached at an end of the sentence part, wherein in a case where the sentence part is a first one in the sequential order, the assigning includes calculating a residual value for the sentence part by subtracting a value of a first expected duration from a value of the speaking time duration parameter, and using the residual value to assign the pausing time for the sentence part; and d) generating the speech data file associated with the text file, the speech data file including, for each of the sentence parts, an audio speech part that, when played, includes a synthesized voice of the sentence part, and a corresponding pausing part that follows the synthesized voice of the sentence part, that does not include a content of the sentence part, and that has a duration which equals to the associated pausing time.

According to another embodiment of the disclosure, the method for generating a speech data file from a text file is implemented using a system that stores a speaking rate parameter reflecting a time duration for a person to say a word, and a speaking time duration parameter reflecting a time duration for the person to say words in a continuous manner in one breath. The text file including a plurality of sentence parts arranged in a sequential order. The method includes:

a) for each of the sentence parts, calculating a number of words included in the sentence part;

b) calculating an expected duration for the sentence part based on the number of words and the speaking rate parameter;

c) assigning a pausing time for the sentence part based on at least the expected duration and the speaking time duration parameter, the pausing time to be attached at an end of the sentence part, wherein in a case where the sentence part is not a first one in the sequential order, the assigning includes calculating a residual value for the sentence part based on the residual value and the pausing time of a previous one of the sentence parts in the sequential order, and using the residual value to assign the pausing time for the sentence part; and d) generating the speech data file associated with the text file, the speech data file including, for each of the sentence parts, an audio speech part that, when played, includes a synthesized voice of the sentence part, and a corresponding pausing part that follows the synthesized voice of the sentence part, that does not include a content of the sentence part, and that has a duration which equals to the associated pausing time.

Another object of the disclosure is to provide a system that is configured to implement the above-mentioned method.

According to one embodiment of the disclosure, the system for generating speech data from a text file includes:

a non-transitory storage medium that stores a speaking rate parameter reflecting a time duration for a person to say a word, and a speaking time duration parameter reflecting a time duration for the person to say words in a continuous manner in one breath; and a processor that is connected to the storage medium, the storage medium storing a software application that includes instructions which, when executed by the processor, cause the processor to perform steps of a method as claimed in Claim 1.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

FIG. 4 illustrates one exemplary text representation in which the text of the audio speech parts are shown.

FIG. 5 one exemplary text representation in which the text of the audio speech parts and subparts are shown.

DETAILED DESCRIPTION

Figure 1:
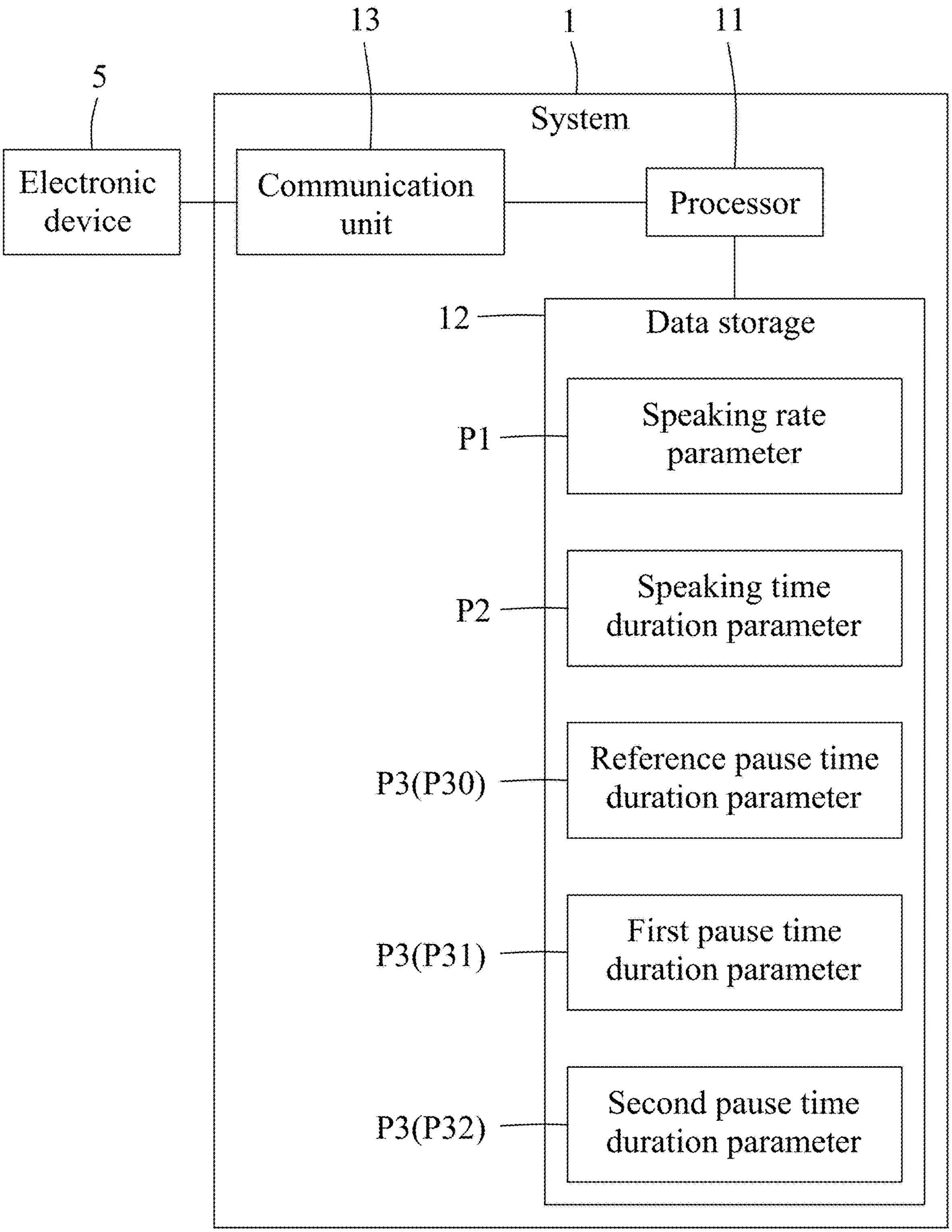
FIG. 1 is a block diagram illustrating an exemplary system for generating a speech data file from a text file according to one embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Throughout the disclosure, the term "coupled to" or "connected to" may refer to a direct connection among a plurality of electrical apparatus/devices/equipment via an electrically conductive material (e.g., an electrical wire), or an indirect connection between two electrical apparatus/devices/equipment via another one or more apparatus/devices/equipment, or wireless communication.

FIG. 1 is a block diagram illustrating an exemplary system 1 for generating a speech data file from a text file according to one embodiment of the disclosure. In the embodiment of FIG. 1, the system 1 is embodied using a server, and may be embodied using a personal computer, a laptop, or other suitable computing equipment in other embodiments.

The system 1 includes a processor 11, a data storage 12, and a communication unit 13.

The processor 11 may be embodied using a central processing unit (CPU), a microprocessor, a microcontroller, a single core processor, a multi-core processor, a dual-core mobile processor, a microprocessor, a microcontroller, a digital signal processor (DSP), a field-programmable gate array (FPGA), an application specific integrated circuit (ASIC), and/or a radio-frequency integrated circuit (RFIC), etc.

The data storage 12 is connected to the processor 11, and may be embodied using, for example, random access memory (RAM), read only memory (ROM), programmable ROM (PROM), firmware, flash memory, etc. In this embodiment, the data storage 12 stores a software application that includes instructions that, when executed by the processor 11, cause the processor 11 to implement the operations as described below. In embodiments, the software application may be a speech synthesizer. The data storage 12 further stores a plurality of speech parameters including a speaking rate parameter P1, a speaking time duration parameter P2, and at least one pause time duration parameter P3. The speech parameters may be associated with a speech that is generated from a text file and that is implemented by an audio file which imitates human speech of the text file.

In embodiments, the speaking rate parameter P1 reflects a time duration for a person to say a word, and its unit is seconds per word. It is noted that, for the convenience of illustration, the term "word" may refer to a Chinese character. Typically, Chinese characters are the functional units in the Chinese writing system, and each character corresponds to a single syllable and is usually a basic morpheme. Since each of the Chinese characters corresponds to a single syllable, in use, the number of words (which equals to the number of syllables) in a sentence may be used for determining the duration for a person to say the sentence by using the speaking rate parameter P1.

For example, a speaking rate parameter P1 of 0.2 represents that a time duration for a person to say a word is 0.2 seconds. As such, a short sentence in Mandarin including ten characters and meaning "today's weather is partly cloudy" takes two seconds to be said. It is noted that in order to imitate different people, other speaking rate parameters P1 may be adopted.

The speaking time duration parameter P2 reflects a time duration for a person to say words in a continuous manner without pause, and its unit is seconds. Specifically, a speaking time duration parameter P2 of 3.5 reflects a person who may talk continuously for 3.5 seconds without pausing for breath. As such, different speaking time duration parameters P2 may be set to reflect people with different levels of vital capacity (VC). It is noted that in order to imitate different people, other speaking time duration parameter(s) P2 may be adopted.

The pause time duration parameter P3 reflects a time duration during which a person stops for breath after speaking continuously for a period, and of its unit is seconds. It is noted that in order to imitate different people, other pause time duration parameter P3 may be adopted. In the embodiment of FIG. 1, three pause time duration parameters P3 are present: a reference pause time duration parameter P30 that is used to imitate a speech pattern of a person which involves a normal pause between sentences, a first pause time duration parameter P31 that is longer than the reference pause time duration parameter P30 and that is used to imitate a speech pattern of a person which involves a moderate pause for breath while talking, and a second pause time duration parameter P32 that is longer than the first pause time duration parameter P31 and that is used to imitate a speech pattern of a person which involves a significant pause for breath while talking. In the embodiment of FIG. 1, the reference pause time duration parameter P30 may be 0.2, the first pause time duration parameter P31 may be 0.4 and the second pause time duration parameter P32 may be 0.8, but other values may be adopted in different embodiments.

In different cases where the voices of different people are to be imitated, different sets of speech parameters may be used. For example, to imitate an adult male, the speaking time duration parameter P2 may be set at 3.5. To imitate a child, the speaking time duration parameter P2 may be set at 1.9, etc. In other embodiments, other values that are greater than zero may be adopted for each of the speaking rate parameter P1, the speaking time duration parameter P2, and the at least one pause time duration parameter P3.

The communication unit 13 is connected to the processor 11, and may include one or more of a radio-frequency integrated circuit (RFIC), a short-range wireless communication module supporting a short-range wireless communication network using a wireless technology of Bluetooth® and/or Wi-Fi, etc., and a mobile communication module supporting telecommunication using Long-Term Evolution (LTE), the third generation (3G), the fourth generation (4G) or the fifth generation (5G) of wireless mobile telecommunications technology, or the like.

In use, the communication unit 13 is configured to establish a communication with at least one external electronic device 5 via a wired or wireless communication. The electronic device 5 may be embodied using a personal computer, a laptop, a tablet, a smartphone, or other suitable other suitable computing equipment in other embodiments. In the embodiment of FIG. 1, one external electronic device 5 is present, but in use the system 1 may be simultaneously in communication with additional electronic device(s) 5 via the communication unit 13.

In use, when a user of the electronic device 5 desires to generate a speech from a text file, the user may operate the electronic device 5 to establish a communication with the system 1, and to input a text file to be transmitted to the system 1. It is noted that in other embodiments, the text file may be pre-stored in the data storage 12 of the system.

Figure 2A:
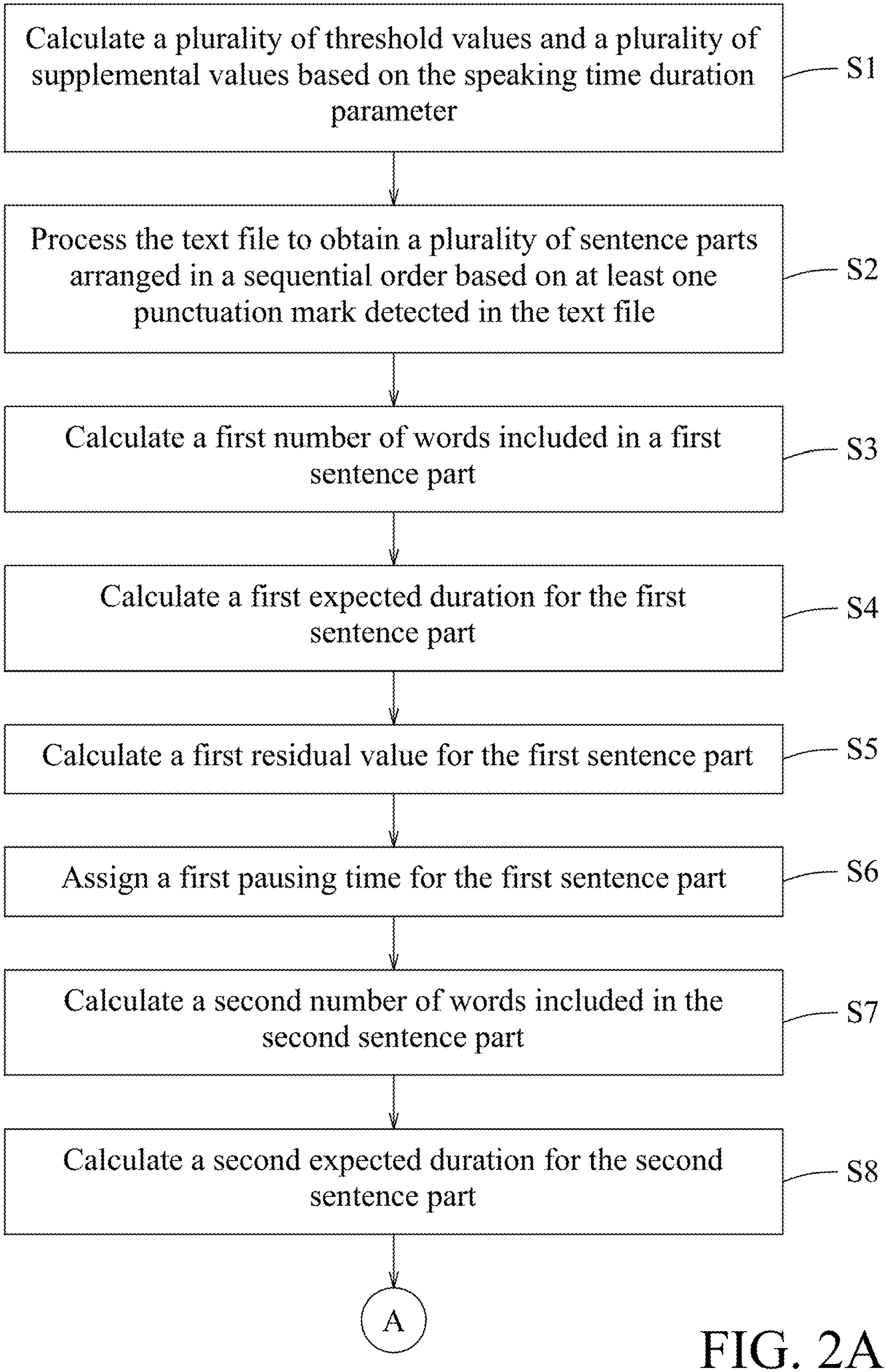
FIGS. 2A and 2B cooperatively show a flow chart illustrating steps of an exemplary method for generating speech data file according to one embodiment of the disclosure.
Figure 2B:
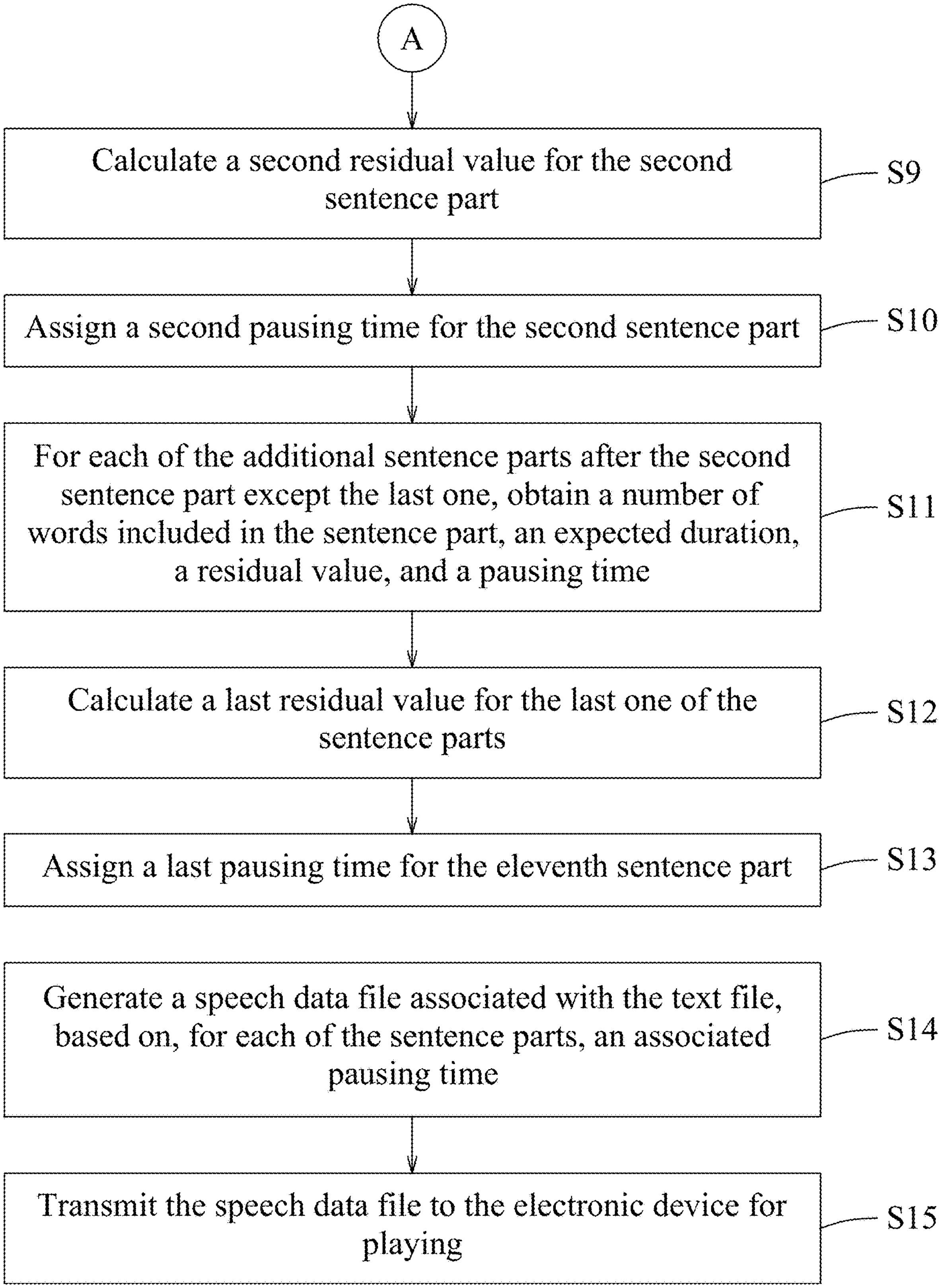

In response to receipt of the text file, the processor 11 executing the software application may initiate a method for generating speech data. FIGS. 2A and 2B cooperatively show a flow chart illustrating steps of an exemplary method for generating speech data according to one embodiment of the disclosure. In the embodiment of FIGS. 2A and 2B, the method may be implemented using the system 1 of FIG. 1.

Figure 3:
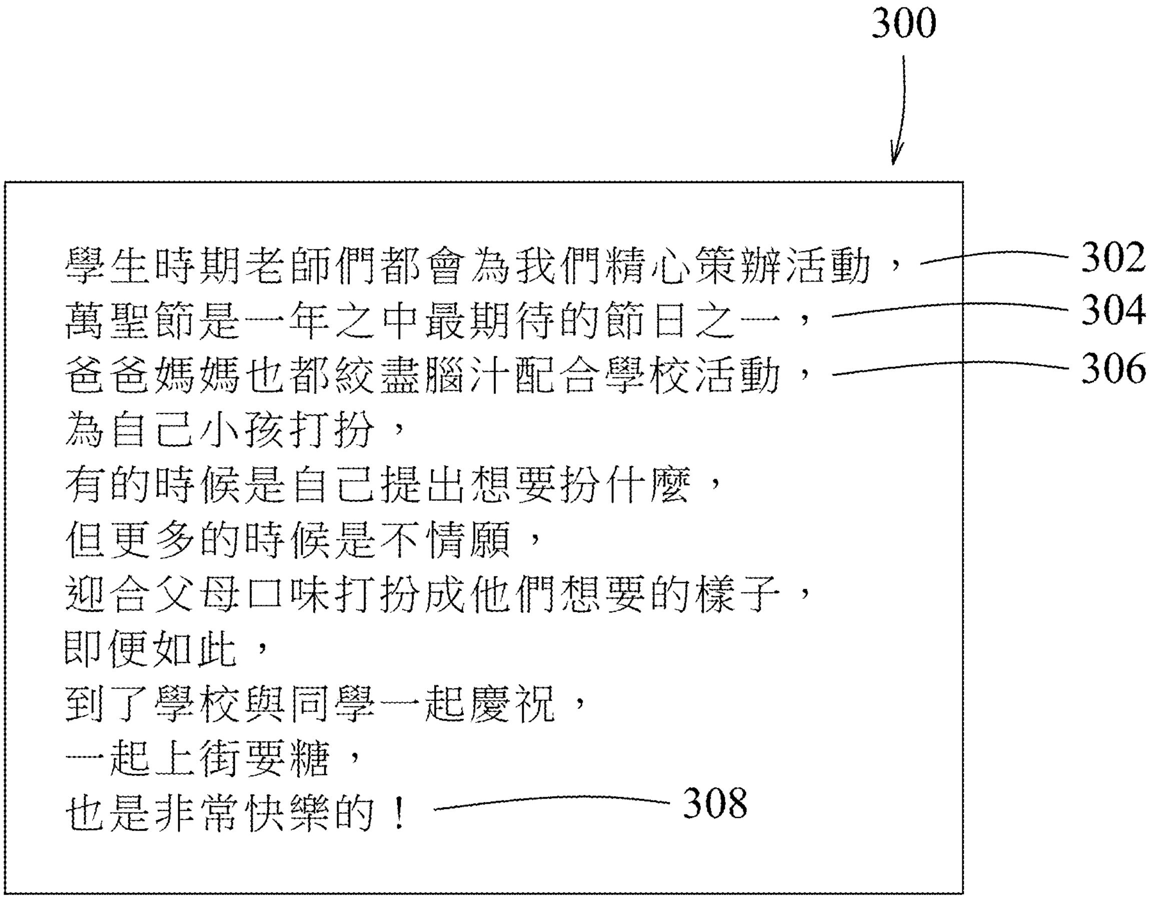
FIG. 3 illustrates an exemplary text file.

In embodiments, the text file may include texts that may include one or more of sentences. For the sake in illustration, FIG. 3 illustrates an exemplary text file 300 in Mandarin, which is used in the subsequent examples. A translation of the text file 300 is: "Throughout the school years, the teachers meticulously organized activities for us. Halloween is one of the most anticipated holidays of all, and our parents worked hard with our school to dress us up. Sometimes we had our own ideas in what we wanted to dress like, but more often we had to go with our parent's ideas for the costumes. Nonetheless, being in school, celebrating with our classmates and going to trick-or-treat were all super fun!" It is noted that while the above text is in one paragraph. In other embodiments, text files with more text and/or additional paragraphs may be processed using the system 1.

In step S1, the processor 11 calculates a plurality of threshold values and a plurality of supplemental values based on the speaking time duration parameter P2.

In the embodiment of FIGS. 2A and 2B, the processor 11 calculates a first threshold value that is a positive value, a second threshold value that is a negative value, and a third threshold value that is a negative value and that is smaller than the second threshold value. In addition, the processor 11 calculates a first supplemental value that is associated with the first pause time duration parameter P31, and a second supplemental value that is associated with the second pause time duration parameter P32.

For example, in the embodiment of FIGS. 2A and 2B, the first threshold value is 0.5 times the speaking time duration parameter P2 (3.5), which is calculated to be 1.75. The second threshold value is −0.5 times the speaking time duration parameter P2, which is calculated to be −1.75. The third threshold value is −1 times the speaking time duration parameter P2, which is calculated to be −3.5. The first supplemental value is 0.5 times the speaking time duration parameter P2, which is calculated to be 1.75. The second supplement value is 1 times the speaking time duration parameter P2, which is calculated to be 3.5.

It is noted that while in the embodiment of FIGS. 2A and 2B, the plurality of threshold values and the plurality of supplemental values are calculated by applying a plurality of preset multipliers to the speaking time duration parameter P2. In other embodiments, different multipliers may be applied to calculate the plurality of threshold values and the plurality of supplemental values.

Then, in step S2, the processor 11 processes the text file to obtain a plurality of sentence parts arranged in a sequential order based on at least one punctuation mark detected in the text file. In this embodiment, the term "sentence part" refers to a string of words that are recognizable by the processor 11, that correspond with syllables and that can be outputted in an audio form (i.e., "pronounced") by the system 1. Two sentence parts are defined to be separated by a punctuation mark which may be one of a comma, a period mark, a space/blank, a semicolon, a question mark, an exclamation mark, a colon, etc.

Using the content of the text file 300 of FIG. 3 as an example, 11 different sentence parts may be defined, with two adjacent sentence parts being separated by a comma. For the sake of convenient description, each of the sentence parts is referred to as, sequentially, a first sentence part 302 (i.e., a sentence part that is first in the sequential order), a second sentence part 304 (i.e., a sentence part that is second in the sequential order), a third sentence part 306, . . . , to an eleventh sentence part 308 (i.e., a sentence part that is last in the sequential order). After the plurality of sentence parts are obtained, the flow goes to step S3.

Then, in step S3, for the first sentence part 302, the processor 11 calculates a first number of words included in the first sentence part 302. In the embodiment of FIGS. 2A and 2B, the processor 11 may determine that 18 Chinese characters are included in the first sentence part 302. As a result, the first number of words equals to 18, since in Mandarin, each character is considered as a word, and is associated with one syllable.

After the first number of words is calculated, the flow goes to step S4.

In step S4, the processor 11 calculates a first expected duration for the first sentence part 302 based on the first number of words and the speaking rate parameter P1. The first expected duration reflects a duration for a person to say the first sentence part 302 (including the first number of words) at a rate that corresponds to the speaking rate parameter P1. Using the above examples, the first number of words is 18 and the speaking rate parameter P1 is 0.2, and the resulting first expected duration is 18*0.2=3.6 seconds. After the first expected duration is calculated, the flow goes to step S5.

Then, in step S5, the processor 11 calculates a first residual value for the first sentence part 302 based on the first expected duration and the speaking time duration parameter P2. In this embodiment, the first residual value is calculated by subtracting a value of the first expected duration from a value of the speaking time duration parameter P2. Using the above examples, the value of the speaking time duration parameter P2 is 3.5 and the value of the first expected duration is 3.6, and the first residual value is (3.5−3.6)=−0.1.

In use, the first residual value may be used to reflect how a person fares after saying the first sentence part 302 in a continuous manner without pause. Specifically, the first expected duration is 3.6 seconds, which means that a person typically takes 3.6 seconds to say the first sentence part 302; the speaking time duration parameter P2 is 3.5 seconds, which means that the person typically can talk continuously without a need to catch his/her breath. As such, a positive first residual value may indicate that the person can say the first sentence part 302 in a continuous manner without issue, and a negative first residual value may indicate that the person is in a struggle to finish saying the first sentence part 302 without pause, with a smaller value (i.e., a negative first residual value with a greater absolute value) indicating that the person faces greater struggle.

After the first residual value is calculated, the flow goes to step S6.

In step S6, the processor 11 assigns a first pausing time for the first sentence part 302 based on the first residual value (which is calculated based on the first expected duration and the speaking time duration parameter P2 in step S5), the second threshold value, and the third threshold value. The first pausing time is to be attached at the end of the first sentence part 302, reflects a duration from a pause of the outputting of the speech right after the first sentence part 302 to a time point right before a start of the second sentence part, and is an imitation of the person pausing for breath after saying the first sentence part 302. In this embodiment, the first pausing time is assigned by first comparing the first residual value and each of the second threshold value (−1.75) and the third threshold value (−3.5), and based on the result of the comparison, the processor 11 may calculate the first pausing time using different manners.

Specifically, with the second threshold value (−1.75) and the third threshold value (−3.5), one of three different results may be obtained: 1) the first residual value (e.g., −1) is no smaller than the second threshold value; 2) the first residual value (e.g., −2) is smaller than the second threshold value and no smaller than the third threshold value; and 3) the first residual value (e.g., −4) is smaller than the third threshold value. In the case where the first result is obtained, the processor 11 sets the first pausing time as the first pause time duration parameter P31 which may be 0.4. In the case where the second result is obtained, the processor 11 sets the first pausing time as the second pause time duration parameter P32 which may be 0.8. On the other hand, in the case where the third result is obtained (indicating that the first sentence part 302 is too long to be realistically said in a continuous manner), the processor 11 may further divide the first sentence part 302 into a plurality of subparts, and repeat steps S3 to S6 for each of the subparts. In other embodiments, in the case where the first sentence part 302 is divided into a plurality of subparts, a subpart pausing time assigned to the end of each of the subparts may be set using one of the pause time duration parameters (e.g., the first pause time duration parameter which is 0.4).

It is noted that in the embodiment of FIGS. 2A and 2B, for the first sentence part 302, the associated first residual value is 0.1 and the first result is obtained. As such, the processor 11 sets the first pausing time as the first pause time duration parameter P31 which may be 0.4.

It is noted that in some embodiments, the assigning may be done based on the first residual value and only one threshold value. In use, the processor 11 may simply compare the first residual value and only one threshold value. In the case where the first residual value is no smaller than the threshold value, the processor 11 sets the first pausing time as the first pause time duration parameter P31 which may be 0.4. On the other hand, in the case where the first residual value is smaller than the threshold value, the processor 11 sets the first pausing time as the second pause time duration parameter P32 which may be 0.8.

After the first pausing time is assigned for the first sentence part 302, the flow proceeds to step S7.

Then, in step S7, for the second sentence part 304, the processor 11 calculates a second number of words included in the second sentence part 304. In the embodiment of FIGS. 2A and 2B, the processor 11 may determine that 16 Chinese characters are included in the first sentence part 302, and as a result the second number of words equals to 16. After the second number of words is calculated, the flow goes to step S8.

In step S8, the processor 11 calculates a second expected duration for the second sentence part 304 based on the second number of words and the speaking rate parameter P1. The second expected duration reflects a duration for the person to say the second sentence part 304 (including the second number of words) at a rate that corresponds with the speaking rate parameter P1. Using the above examples, the second number of words is 16 and the speaking rate parameter P1 is 0.2, and the resulting second expected duration equals to 16*0.2=3.2 seconds. After the second expected duration is calculated, the flow goes to step S9.

Then, in step S9, the processor 11 calculates a second residual value for the second sentence part 304 based on the second expected duration, a residual value associated with a previous one of the sentence parts (e.g., in this case, the first residual value which is −0.1), and one of the supplemental values associated with a pausing time that is associated with a previous one of the sentence parts (which is the first pausing time in this embodiment).

In this embodiment, the first pausing time is associated with the first supplement value (which is 1.75), and the second residual value is calculated by first adding the first residual value to the first supplement value (−0.1+1.75=1.65) and then subtracting the second expected duration from the sum (1.65−3.2=−1.55).

It is noted that in general, in the case where a previous one of the sentence parts is associated with the first pause time duration parameter P31 which may be 0.4, the processor 11 calculates the second residual value by first adding the first residual value to the first supplement value, and then subtracting the second expected duration from the sum. In the case where a previous one of the sentence parts is associated with the second pause time duration parameter P32 which may be 0.8, the processor 11 calculates the second residual value by first adding the first residual value to the second supplement value (which may be 3.5), and then subtracting the sum from the second expected duration.

In use, the second difference duration may be used to reflect how a person fares after speaking the second sentence part 304 in a continuous manner without stopping, the action after saying the second sentence part 304 itself is implemented after saying the first sentence part 302. Therefore, how the person behaves after saying the first sentence part 302 is taken into consideration.

Specifically, in the case where the first pause time duration parameter P31 is involved, which means that the person makes a moderate pause for breath (e.g., pauses for 0.4 seconds to breathe) after saying the first sentence part 302, and with the breath, the person may have regained some of his/her strength in terms of vital capacity, therefore may be able to speak for an additional 1.75 seconds in a continuous manner without stopping. On the other hand, in the case where the second pause time duration parameter P32 is involved, which means that the person makes a significant pause for breath (e.g., pauses for 0.8 seconds to breathe) after saying the first sentence part 302, and with the breath, the person may have regained most of his/her strength in terms of vital capacity, and therefore may be able to speak for an additional 3.5 seconds in a continuous manner without stopping. Afterward, the manner in which the second residual value is calculated for the second sentence part 304 may be applied to the subsequent sentence parts in the sequential order. In general, the calculation of each of the residual values of the sentence parts that are not the first in the sequential order is based on the residual value and the pausing time of a previous one of the sentence parts in the sequential order.

After the second residual value is calculated, the flow goes to step S10.

In step S10, the processor 11 assigns a second pausing time for the second sentence part 304 based on the second residual value, the first threshold value, the second threshold value, and the third threshold value. The second pausing time reflects a duration from a pause of the outputting of the speech right after the second sentence part 304 to a time point right before a start of the third sentence part, and is an imitation of the person pausing for breath after saying the second sentence part 304. Generally, the operation of assigning a second pausing time may also be done with respect to the sentence part(s) that come after the second sentence part 304.

In this embodiment, the second pausing time is assigned by first comparing the second residual value and each of the first threshold value (1.75), the second threshold value (−1.75) and the third threshold value (−3.5), and based on the result of the comparison, the processor 11 may assign the second pausing time using different manners.

Specifically, with the first threshold value (1.75), the second threshold value (−1.75) and the third threshold value (−3.5), one of four different results may be obtained: 1) the second residual value (e.g., 3) is no smaller than the first threshold value; 2) the second residual value (e.g., 0) is smaller than the first threshold value and no smaller than the second threshold value; 3) the second residual value (e.g., −2) is smaller than the second threshold value and no smaller than the third threshold value; and 4) the second residual value (e.g., −4) is smaller than the third threshold value. In the case where the first result is obtained, the processor 11 sets the second pausing time as the reference pause time duration parameter P30 which may be 0.2. In the case where the second result is obtained, the processor 11 sets the second pausing time as the first pause time duration parameter P31 which may be 0.4. In the case where the third result is obtained, the processor 11 sets the second pausing time as the second pause time duration in parameter P32 which may be 0.8. On the other hand, in the case where the fourth result is obtained (indicating that the second sentence part 304 is too long to be realistically said in a continuous manner), the processor 11 may further divide the second sentence part 304 into a plurality of subparts, and repeat steps S7 to S10 for each of the subparts. In other embodiments, in the case where the second sentence part 304 is divided into a plurality of subparts, a subpart pausing time assigned to the end of each of the subparts may be set using one of the pause time duration parameters (e.g., the first pause time duration parameter which is 0.4).

It is noted that in the embodiment of FIGS. 2A and 2B, for the second sentence part 304, the associated second residual value is −1.55 and the second result is obtained. As such, the processor 11 sets the second pausing time as the first pause time duration parameter P31 which may be 0.4.

It is noted that in some embodiments, the assigning may be done based on the second residual value and only two threshold values (e.g., a positive threshold value (e.g., 1.75) and a negative threshold value (e.g., −3.5) that is smaller than the positive threshold value). In use, the processor 11 may simply compare the second residual value to each of the two threshold values. In the case where the second residual value is no smaller than the positive threshold value, the processor 11 sets the second pausing time as the reference pause time duration parameter P30 which may be 0.2. In the case where the second residual value is smaller than the positive threshold value and no smaller than the negative threshold value, the processor 11 sets the second pausing time as the first pause time duration parameter P31 which may be 0.4. On the other hand, in the case where the second residual value is smaller than the negative threshold value, the processor 11 sets the second pausing time as the second pause time duration parameter P32 which may be 0.8.

After the second pausing time is assigned for the second sentence part 304, the flow proceeds to step S11.

In step S11, in the case where the text file 300 includes more than two sentence parts, the processor 11 implements, for each of the additional sentence parts after the second sentence part 304 except the last one of the sentence parts, the operations of steps S7 to S10 as described above, so as to obtain a number of words included in the sentence part, an expected duration, a residual value, and a pausing time. It is noted that in calculating the above information for the sentence part, information associated with a previous one of the sentence parts may be involved, and as such, the operations of step S11 is done sequentially with respect to the sentence parts included in the text file 300. In the example of FIG. 3, the operations may be done, one by one, with respect to the third sentence part 306 to the tenth one of the sentence parts. Then, the flow proceeds to step S12.

It is noted that in the case where the text file 300 includes exactly three sentence parts, the operations of step S11 may be omitted and the flow may proceed directly to step S12.

In step S12, the processor 11 calculates a last residual value for the last one of the sentence parts (which may be referred to as an eleventh sentence part 308). In embodiments, the operations of calculating the last residual value may be done similar to the operations of steps S7 to S9, and details thereof are omitted herein for the sake of brevity. After the last residual value is calculated, the flow goes to step S13.

In step S13, the processor 11 assigns a last pausing time for the eleventh sentence part 308, and determines whether the eleventh sentence part 308 needs to be divided into shorter subparts. Specifically, in this embodiment, the processor 11 may directly assign the last pausing time using the second pause time duration parameter P32, which may be 0.8, but in other embodiments, different last pausing times may also be assigned, regardless of the content of the previous one of the sentence parts.

Then, the processor 11 determines whether the eleventh sentence part 308 needs to be divided into shorter subparts by comparing the last residual value with the third threshold value. In the case where the last residual value is smaller than the third threshold value, the processor 11 proceeds to divide the eleventh sentence part 308 into shorter subparts in a manner that is similar to the above-described operations, and to repeat steps S11 to S12 for the subparts. In other embodiments, in the case where the eleventh sentence part 308 is divided into a plurality of subparts, a subpart pausing time assigned to the end of each of the subparts may be set using one of the pause time duration parameters (e.g., the first pause time duration parameter which is 0.4). After the operations of step S13 is completed, the flow proceeds to step S14.

In step S14, the processor 11 executes the speech synthesizer to generate a speech data file associated with the text file 300, based on, for each of the sentence parts, an associated pausing time. Specifically, in this embodiment, the speech data file may include a plurality of audio speech parts and a plurality of corresponding pausing parts. Each of the audio speech parts is associated with one of the sentence parts or subparts, and may contain synthesized audio speech of the one of the sentence parts or subparts. Each of the pausing parts is associated with a corresponding pausing time. That is to say, the speech data file is generated to include, for each of the sentence parts, an audio speech part that, when played, includes a synthesized voice of the sentence part, and a corresponding pausing part that follows the synthesized voice of the sentence part, that does not include the content of the sentence part, and that has a duration which equals to the associated pausing time. It is noted that using the speech synthesizer for generating the speech data file is well known in the related art, details thereof are omitted herein for the sake of brevity.

In use, the speech data file may then be outputted by the system 1 or other electronic devices in the form of an audio file. In playing the speech data file, each pair of the audio speech part and the corresponding pausing part is played. Specifically, the audio speech part is generated to imitate a person "saying" the content of the sentence part, and the corresponding pausing part is generated to imitate a person "pausing" or "breathing" before saying the next sentence part, and may be in the form of silence or a simulated breathing sound for the duration that is identical to the pausing time as assigned above. It is noted that during the pausing part, no additional text will be "said." For example, after the first sentence part is "said," the corresponding pausing part may include 0.4 seconds of silence or breathing sound.

In the cases where one of the sentence parts is divided into a plurality of subparts, the speech data file may include a plurality of audio speech subparts and a plurality of corresponding pausing subparts. Specifically, the audio speech subpart is generated (e.g., via speech synthesis) to imitate a person "saying" the content of the subpart of the sentence part, and the corresponding pausing subpart is generated to imitate a person "pausing" or "breathing" before saying the next subpart, and may be in the form of silence or a simulated breathing sound for the duration that is identical to a subpart pausing time assigned to the pausing subpart using the method as described above. It is noted that during the pausing subpart, no additional text will be "said."

In different embodiments, the speech data file may further include a text representation that illustrates the content of the text file 300 being divided into the sentence parts or subparts. Specifically, FIG. 4 illustrates one exemplary text representation in which the text of the audio speech parts are shown. In this example, the sentence parts are simply separated by the commas in the text. Each of the sentence parts is enclosed using the symbols "{ }" and each of the pausing parts is represented using the symbol "_."

FIG. 5 illustrates one exemplary text representation in which the text of the audio speech parts and subparts are shown. In this case, each of the subparts is enclosed using the symbols "[ ]," and each of the pausing subparts is represented using the symbol "#."

After the speech data file is generated, the flow proceeds to step S15.

In step S15, the processor 11 transmits the speech data file via the communication unit 13 to the electronic device 5. In response to receipt of the speech data file, the user of the electronic device 5 may then play the speech data file.

In one example, when playing the speech data file, after the first sentence part 302 is played, a pause or breathing sound of 0.4 seconds is played. Then, after the second sentence part 304 is played, a pause or breathing sound of 0.8 seconds is played. In this manner, the speech data file may be played to imitate a speech of the text file 300 that is more natural.

As such, the method of FIGS. 2A and 2B is concluded.

It is noted that while in the above embodiments, the operations of calculating the number of words for each of the sentence parts are implemented with respect to the language of Mandarin, in other embodiments where the text file 300 includes text of other languages, different manners of the calculation of the number of words may be implemented based on other characteristics of the text file 300 (e.g., a number of English words and/or a number of syllables, etc.) to accommodate the different languages.

To sum up, the embodiments of the disclosure provide a method and a system for generating a speech data file from a text file to be outputted by an electronic device. In the method, the system is configured to implement the method to first process the text file to obtain a plurality of sentence parts. Then, for each of the sentence parts, the system calculates a number of words included in the sentence part, an expected duration for the sentence part based on the number of words, and a pausing time to be added after the sentence part based on the expected duration. In this manner, in generating the speech data file, after an audio speech part of one of the sentence parts is played, a corresponding pause or breathing sound is added to make the resulting speech sound more natural.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method for generating a speech data file from a text file, the method being implemented using a system that stores a speaking rate parameter that reflects a time duration for a person to say a word, a speaking time duration parameter that reflects a time duration for the person to say words in a continuous manner without trouble, and a plurality of pause time duration parameters that include a first pause time duration parameter and a second pause time duration parameter that is longer than the first pause time duration parameter, the text file including a plurality of sentence parts arranged in a sequential order, the method comprising:

a) for each of the sentence parts, calculating a number of words included in the sentence part;

b) calculating an expected duration for the sentence part based on the number of words and the speaking rate parameter;

c) assigning a pausing time for the sentence part based on at least the expected duration and the speaking time duration parameter, the pausing time to be attached at an end of the sentence part, wherein in a case where the sentence part is a first one in the sequential order, the assigning includes calculating a residual value for the sentence part by subtracting a value of a first expected duration from a value of the speaking time duration parameter, and using the residual value to assign the pausing time for the sentence part; and d) generating the speech data file associated with the text file, the speech data file including, for each of the sentence parts, an audio speech part that, when played, includes a synthesized voice of the sentence part, and a corresponding pausing part that follows the synthesized voice of the sentence part, that does not include a content of the sentence part, and that has a duration which equals the associated pausing time;

wherein in step c), in a case where the sentence part is the first one in the sequential order, the assigning further includes:

comparing the residual value with a threshold value;

in a case where the residual value is equal to or larger than the threshold value, setting the pausing time as the first pause time duration parameter; and in a case where the residual value is smaller than the threshold value, setting the pausing time as the second pause time duration parameter;

wherein step c) further includes, in a case where the residual value is smaller than a negative threshold value, dividing the sentence part into a plurality of subparts, and setting, for each of the subparts, a subpart pausing time to an end of the subpart, the subpart pausing time being set using one of the plurality of pause time duration parameters; and wherein step d) includes generating the speech data file to further include, for each of the subparts of the sentence part, an audio speech subpart that, when played, includes a synthesized voice of the sentence subpart, and a corresponding pausing subpart that follows the synthesized voice of the sentence subpart, that does not include a content of the sentence subpart and that has a duration which equals the subpart pausing time.

2. The method as claimed in claim 1, further comprising, prior to step a):

processing the text file to obtain the plurality of sentence parts in the sequential order based on at least one punctuation mark detected in the text file.

3. A method for generating a speech data file from a text file, the method being implemented using a system that stores a speaking rate parameter reflecting a time duration for a person to say a word, and a speaking time duration parameter reflecting a time duration for the person to say words in a continuous manner in one breath, the system further storing a plurality of pause time duration parameters that include a reference pause time duration parameter, a first pause time duration parameter that is longer than the reference pause time duration parameter, and a second pause time duration parameter that is longer than the first pause time duration parameter, the text file including a plurality of sentence parts arranged in a sequential order, the method comprising:

a) for each of the sentence parts, calculating a number of words included in the sentence part;

b) calculating an expected duration for the sentence part based on the number of words and the speaking rate parameter;

c) assigning a pausing time for the sentence part based on at least the expected duration and the speaking time duration parameter, the pausing time to be attached at an end of the sentence part, wherein in a case where the sentence part is not a first one in the sequential order, the assigning includes calculating a residual value for the sentence part based on the residual value and the pausing time of a previous one of the sentence parts in the sequential order, and using the residual value to assign the pausing time for the sentence part; and d) generating the speech data file associated with the text file, the speech data file including, for each of the sentence parts, an audio speech part that, when played, includes a synthesized voice of the sentence part, and a corresponding pausing part that follows the synthesized voice of the sentence part, that does not include a content of the sentence part, and that has a duration which equals the associated pausing time;

wherein in step c), in a case where the sentence part is not the first one in the sequential order, the assigning further includes:

comparing the residual value to each of a positive threshold value and a negative threshold value;

in a case where the residual value is equal to or larger than the positive threshold value, setting the pausing time as the reference pause time duration parameter;

in a case where the second residual value is smaller than the positive threshold value and is equal to or larger than the negative threshold value, setting the pausing time as the first pause time duration parameter; and in a case where the second residual value is smaller than the negative threshold value, setting the pausing time as the second pause time duration parameter;

wherein step c) further includes, in a case where the residual value is smaller than a negative threshold value, dividing the sentence part into a plurality of subparts, and setting, for each of the subparts, a subpart pausing time to an end of the subpart, the subpart pausing time being set using one of the plurality of pause time duration parameters; and wherein step d) includes generating the speech data file to further include, for each of the subparts of the sentence part, an audio speech subpart that, when played, includes a synthesized voice of the sentence subpart, and a corresponding pausing subpart that follows the synthesized voice of the sentence subpart, that does not include a content of the sentence subpart and that has a duration which equals the subpart pausing time.

4. The method as claimed in claim 3, further comprising, prior to step a):

processing the text file to obtain the plurality of sentence parts in the sequential order based on at least one punctuation mark detected in the text file.

5. A system for generating speech data from a text file, comprising:

a non-transitory storage medium that stores a speaking rate parameter reflecting a time duration for a person to say a word, and a speaking time duration parameter reflecting a time duration for the person to say words in a continuous manner in one breath; and a processor that is connected to the storage medium, the storage medium storing a software application that includes instructions which, when executed by the processor, cause the processor to perform steps of a method as claimed in claim 1.

6. A system for generating speech data from a text file, comprising:

a non-transitory storage medium that stores a speaking rate parameter reflecting a time duration for a person to say a word, and a speaking time duration parameter reflecting a time duration for the person to say words in a continuous manner in one breath; and a processor that is connected to the storage medium, the storage medium storing a software application that includes instructions which, when executed by the processor, cause the processor to perform steps of a method as claimed in claim 3.

* * * * *